(12) United States Patent
Cortequisse et al.

(10) Patent No.: US 8,414,256 B2
(45) Date of Patent: Apr. 9, 2013

(54) ONE-PIECE BLADED DRUM OF AN AXIAL TURBOMACHINE COMPRESSOR

(75) Inventors: Jean-François Cortequisse, Heers (BE); André Lhoest, Huy (BE)

(73) Assignee: Techspace Aero, S.A., Herstal (Milmort) (BE)

( * ) Notice: Subject to any disclaimer, the term of this patent is extended or adjusted under 35 U.S.C. 154(b) by 703 days.

(21) Appl. No.: 12/580,070

(22) Filed: Oct. 15, 2009

(65) Prior Publication Data

US 2010/0158690 A1 Jun. 24, 2010

(30) Foreign Application Priority Data

Dec. 24, 2008 (EP) .................................. 08172923

(51) Int. Cl.
*F04D 29/52* (2006.01)

(52) U.S. Cl.
USPC .................................. 415/199.5; 416/213 R

(58) Field of Classification Search ............... 415/199.5; 416/198 R, 201 R, 213 R
See application file for complete search history.

(56) References Cited

U.S. PATENT DOCUMENTS

| | | | | |
|---|---|---|---|---|
| 2,143,466 A | * | 1/1939 | Allard | 416/213 R |
| 2,944,326 A | * | 7/1960 | Stadthaus et al. | 29/889.22 |
| 3,385,512 A | * | 5/1968 | Bandukwalla | 416/221 |
| 3,625,634 A | * | 12/1971 | Stedfeld | 416/198 R |
| 6,719,186 B2 | * | 4/2004 | Mudge et al. | 228/215 |
| 6,969,239 B2 | * | 11/2005 | Grant et al. | 416/220 R |

FOREIGN PATENT DOCUMENTS

| | | |
|---|---|---|
| CH | 238024 | 7/1945 |
| DE | 752921 | 7/1944 |
| EP | 503697 A1 * | 9/1992 |
| EP | 1176284 A2 | 1/2002 |
| EP | 1319842 A | 6/2003 |
| EP | 1319842 A1 | 6/2003 |
| EP | 1658923 A2 | 5/2006 |
| GB | 776618 | 6/1957 |
| RU | 2270937 C1 | 2/2006 |

OTHER PUBLICATIONS

Search Report, EP, May 25, 2009.

* cited by examiner

*Primary Examiner* — Edward Look
*Assistant Examiner* — William Grigos
(74) *Attorney, Agent, or Firm* — James E. Walton; Richard G. Eldredge

(57) ABSTRACT

A compressor drum for an axial turbo-machine includes a hollow body generally symmetrical in revolution about its axis of rotation and forming a shell at the periphery of which are arranged a plurality of parallel rows of vanes, each row corresponding to one stage of the compressor. Each vane includes at its root an attachment platform housed in a corresponding opening made in the shell of the hollow body. The outer surface of each platform is flush with the outer surface of the shell at the edge of the opening and each platform is attached to the hollow body by welding between the outer edge of the platform and the inner edge of the corresponding opening. The platform has the general shape of a parallelogram, a bisector of which corresponds approximately to the main axis of the profile of the vane at the platform.

15 Claims, 3 Drawing Sheets

ONE-PIECE BLADED DRUM OF AN AXIAL TURBOMACHINE COMPRESSOR

This application claims priority under 35 U.S.C. §119 to European Patent Application No. 08172923.8, filed 24 Dec. 2008, titled "One-Piece Drum of an Axial Turbomachine Compressor," which is incorporated herein by reference for all purposes.

BACKGROUND

1. Field of the Application

The present application concerns an axial turbomachine compressor drum, more specifically a drum equipped with a plurality of rows of vanes, each row, together with a row of vanes of the stator directly downstream from said row, forming one stage of the compressor.

2. Description of Related Art

It is known, for example from patent GB 776,618, to attach the vanes of an axial compressor to its drum by mechanical assembly. Each of the vanes comprises a root having a shape suitable for engaging in abutment with a groove provided on the drum. Typically, the vane root, having two projecting edges forming a hook, is inserted in a circular groove of the drum serving as housing for the vane roots and the vane is then turned along its main axis in such a way that the two edges projecting from the root enter into so-called positive contact, i.e. in abutment, with the two edges of the groove of the drum. Various means of locking the vane in this position are provided in this document, such as screwing means at the root of the vane, screwing means at the drum, sliding lug means on the vane root, under pressure of a spring and capable of engaging with the elements of the drum, or conical shims and counter-shims between the root and the two edges of the groove, said shims and counter-shims being held in place by welding. This technique of attaching vanes to a compressor drum has the disadvantage of requiring a significant mass of material at the vane root as well as at the groove. Indeed, the vanes of the rotor of a compressor are subject to considerable centrifugal as well as other forces. These stresses require a strong attachment of the vanes to the drum. To that end, the roots of the vanes, in particular the hook-forming projecting parts, as well as the edges of the circumferential groove of the drum with which the root of the vane engages, are dimensioned to be rather large. This mass of material at the periphery of the drum causes large centrifugal stresses that the drum must be able to absorb. These excess centrifugal forces to be absorbed require a larger dimensioning of the drum and thus greater weight and higher cost.

A lighter construction of a compressor drum is known from the patent RU 2,270,937 C1. The shell of the drum is constructed by an assembly of rings or spacers connected to each other by rows of vane platforms. The rows of vane platforms form the extension of the shell of the drum. These platforms are welded to each other and to intermediate sections of the shell. However, this construction lacks rigidity and requires numerous reinforcements from the center of the drum to the inner face of the shell, either directly beneath the vanes or beneath the intermediate sections of the shell. This construction proves to be complex, requiring much time to assemble. Production costs are therefore relatively high.

Patent application EP 1319842 A1 discloses a drum in several parts or sections along the axis of rotation and assembled by screwing. The vanes are attached therein at the junctions between the sections, either by interlocking, or directly by screwing means. Indeed, in the first case, the vane roots have a shape with edges projecting approximately along the direction of the axis of rotation, said projecting edges engaging with corresponding grooves on each section end at the junction thereof. During the assembly of two sections, the vane roots, in particular the projecting edges thereof, are confined in the opposite grooves of the sections and are placed under pressure when the attaching means are tightened. In the second case, the vane roots include bores through which the means of attaching the sections are assembled. This construction of the drum or rotor in several sections or rings poses problems of precision during assembly. Moreover, the parts of sections engaging with the vane roots and also with the attachment means must be dimensioned rather large in size in order to be able to absorb the centrifugal forces on the vanes, as well as the occasional stresses from tightening them.

Although great strides have been made in the area of axial turbomachine compressor drums, many shortcomings remain.

DETAILED DESCRIPTION OF THE PREFERRED EMBODIMENT

Figure 1:
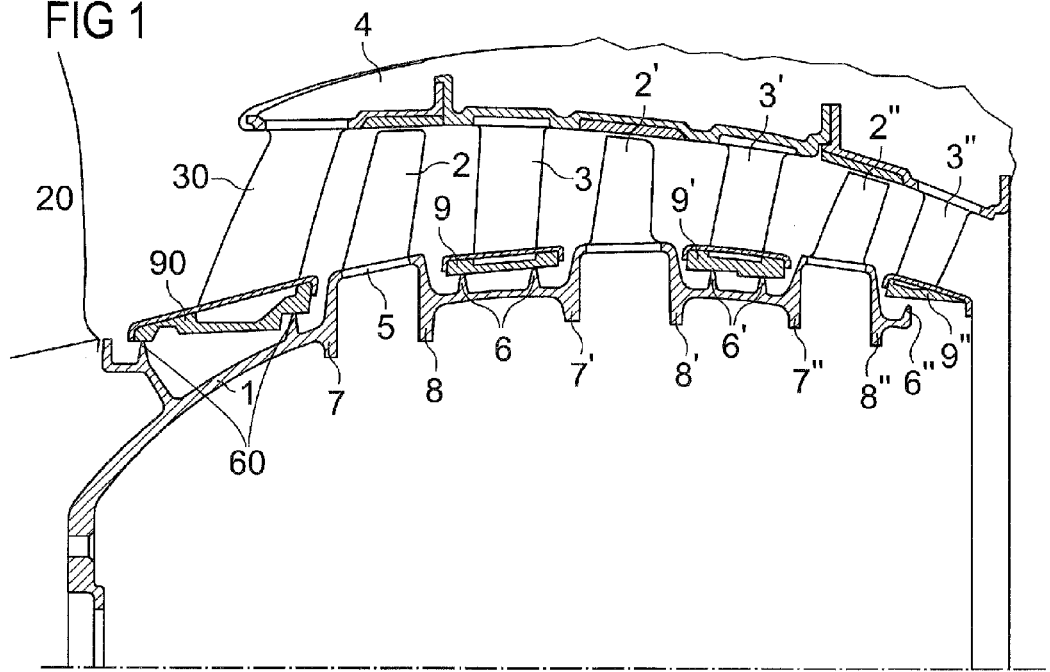
FIG. 1 is a cross sectional view of a drum and stator of a compressor, according to the present application.

The present application consists of a compressor drum rotor stage for an axial turbo-machine, comprising a hollow body, generally symmetrical in revolution about an axis of revolution corresponding to the axis of the turbo-machine; a plurality of vanes arranged at the periphery of the body; where each vane of the plurality of vanes comprises at its root an attachment platform housed in a corresponding opening made in the hollow body, each platform being housed in a corresponding opening in such a way that the outer surface of each platform is essentially flush with the outer surface of the hollow body at the edge of the corresponding opening; and each platform is attached to the hollow body by welding between the outer edge of the platform and the inner edge of the corresponding opening.

This drum construction, particularly the assembly of vanes to the drum, allows a saving of material and thus a substantial saving in mass of the shell. The material needed for producing the large vane roots, including the attachment bulb (for insertion in the slots and grooves of the drum) according to the prior art, is no longer necessary, allowing an optimized distribution of thicknesses and a substantial saving in mass. In addition, because of assembly by welding, the interfaces between the vanes and the drum are greatly simplified and the tolerances on the vane roots and on recipient areas of the drum are less strict. This decreases machining costs and the number of non-conformities.

This drum construction, particularly the assembly of the vanes to the drum, also allows better control of the position of the vanes with respect to the drum, greatly reducing or even eliminating the rotations of the vanes in the drum in operation, as can occur in the prior art.

Preferably the openings are made in the hollow body in such a way as to form at least one row around the circumference of the hollow body.

Preferably the hollow body is of a single piece, preferably of the same material.

Preferably the openings are made in the hollow body by machining.

Preferably the openings and the corresponding platforms have the general shape of a parallelogram with rounded corners.

Preferably the hollow body comprises two side-plates, each generally in a plane perpendicular to the axis, one being upstream and the other downstream from the row of openings, the outer edges of the side-plates preferably being in proximity to the openings of the row.

The ribs (extension of the upstream and downstream side-plates toward the interior of the hollow body) optimize the stiffening of the drum and make it possible to better manage the ovalization of the drum under rated as well as extreme operating conditions.

Preferably the hollow body comprises two interior annular ribs each forming one of the upstream and downstream side-plates of the row of openings.

Preferably the hollow body comprises a generally cylindrical part made of one piece, preferably formed as an integral part of the downstream side-plate and having at least one circular rib around its circumference intended to engage by friction with a ferrule of a guide vane, forming with the row of rotor stage vanes a compressor stage.

Preferably an elastomer is applied to the inner face of the platforms and the inner faces of the upstream and downstream side-plates in order to provide for absorption of vibrations from the vanes and the hollow body.

Preferably at least two opposite edges of the openings and the corresponding edges of the platforms are beveled so as to reduce the passage cross section of the openings to the interior of the hollow body, thus allowing the installation of the vanes in the openings from the outside of the hollow body.

Preferably the connection by welding between the platforms and the openings is made around the entire periphery of the platforms.

Preferably the connection by welding between the platforms and the openings is made starting from the outer surface of the hollow body.

Preferably each vane of the plurality of vanes is of a piece with its platform, preferably formed as an integral part of its platform.

The present application also concerns a compressor drum for an axial turbo-machine comprising at least one rotary stage as described above.

The present application also concerns a compressor of an axial turbo-machine comprising a drum as defined above.

The present application also concerns an axial turbo-machine comprising a compressor as defined above.

The present application also concerns a method of obtaining a compressor drum stage for an axial turbo-machine, comprising:

providing a hollow body generally symmetrical in revolution with respect to an axis of rotation corresponding to the axis of the turbo-machine;

providing a plurality of vanes with an attachment platform at the roots thereof; and attaching the vanes to the hollow body by their attachment platforms;

wherein openings corresponding to the platforms of the vanes are made in the hollow body; and wherein the step of attaching the vanes consists of inserting the platform of each vane in a corresponding opening of the hollow body in such a way that the outer surface of each platform is essentially flush with the outer surface of the hollow body at the edge of the corresponding opening; and wherein each platform is attached to the hollow body by welding, preferably cylindrical or conical, between the outer edge of the platform and the inner edge of the corresponding opening.

Advantageously, a cylinder is inserted into the hollow body during the welding operation in order to protect the other parts of the drum.

A compressor comprising a drum according to the present application is illustrated in FIG. 1. It shows a cross sectional view of the rotor and stator. The rotor is composed of a hollow body 1, generally in the form of a cylindrical shell. Said shell is generally symmetrical in revolution with respect to its axis of rotation. For reasons of simplicity of illustration, FIG. 1 shows only the upper half of the rotor and stator unit, with the understanding that the lower half is symmetrical to the upper half with respect to the axis of rotation. This is true for the stator 4 as well. The stator 4 and the rotor 1 define an annular passage for an airstream to move and compress from left to right, as shown in FIG. 1. To that end, the rotor comprises a fan 20 (partially represented at the extreme left of the figure) and three parallel rows of vanes 2, 2' and 2". Said vanes are rigidly fixed to the shell and thus turn with the rotor. Rows of guide vanes 30, 3, 3', 3" are arranged between the rows of rotor vanes. These guide vanes are rigidly fixed at their upper ends to the stator 4. Each row of fixed vanes constitutes a guide grille whose purpose is to guide the airflow arriving from the row of rotor vanes directly upstream. A row of rotor vanes combined with a row of stator vanes directly downstream constitutes one stage of the compressor. In the case of FIG. 1, for example, the compressor has four stages, the first composed of the rows of rotor vanes 20 and stator vanes 30, the second composed of the rows of rotor vanes 2 and stator vanes 3, the third composed of the rows of rotor vanes 2' and stator vanes 3' and the fourth composed of the rows of rotor vanes 2" and stator vanes 3". A row of stator vanes 30 is present between the fan 20 and the first row of rotor vanes 2. This row of vanes guides the airflow generated by the fan 20.

As can be seen in FIG. 1, the guide vanes 30, 3, 3' and 3" are fixed to the outer ferrules of the stator 4. The lower ends of the vanes of each row of the stator are fitted into an inner ferrule 90, 9, 9', 9". Each ferrule is dimensioned in such a way as to link the stator vanes to each other and to engage sealably with the rotor 1. Indeed, each ferrule has on its inner face an abradable material which, as the word indicates, has the ability to disaggregate in fine powder during friction with the wipers 60, 6, 6', 6" of the rotor. These wipers are circular ribs on the outer surface of the rotor facing inner ferrules 90, 9, 9' and 9", respectively. Said ribs extend in a plane generally perpendicular to the axis of rotation of the rotor and have a pointed outer edge that can make contact with the abradable material in order to provide a certain sealing while minimizing the contact surface and thus the frictional forces.

Figure 2:
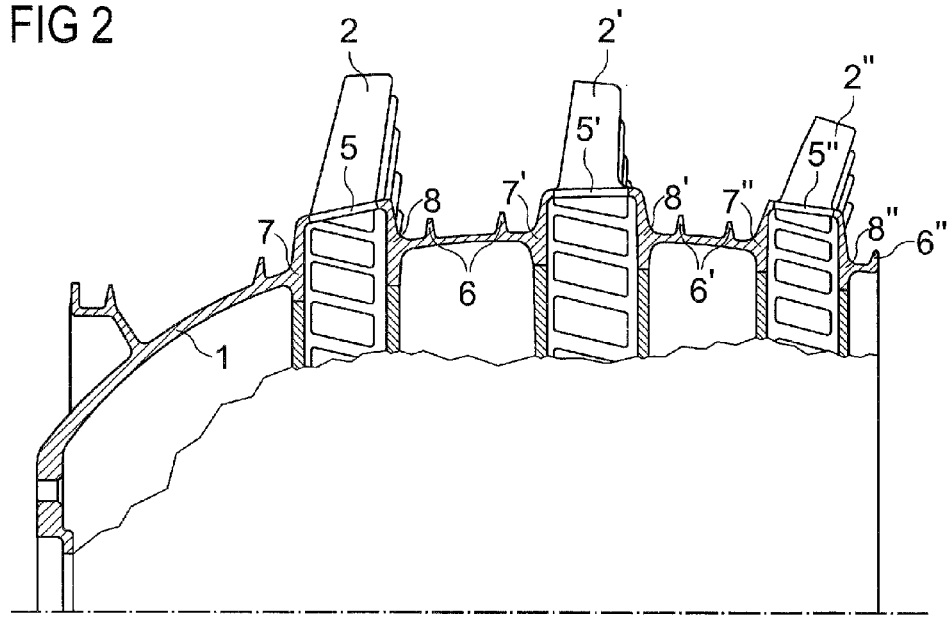
FIG. 2 is a partial view of the exterior of the drum according to the present application.

The drum of the compressor of FIG. 1 is illustrated in FIG. 2. The drum or rotor is comprised of a one-piece shell 1. The drum generally has an axial symmetry of revolution, its wall being formed by the shell 1. The drum is typically obtained by machining a forged part, but other methods of forming well-known in the industry can be considered. As can be seen in FIG. 2, the shell 1 is extended at rows of rotor vanes by side-plates on either side of each row. Indeed, the first row of vanes 2 is supported by the side-plates 7 and 8. Said side-plates are generally annular in a plane generally perpendicular to the axis of the drum. The inner parts of the side-plates 7 and 8 open into the interior volume of the drum in order to form ribs reinforcing the drum, and the outer parts form outer side-plates of the drum which form the airflow in line with the interior ferrules of the guide vane stages upstream and downstream. The shell 1 is connected to an intermediate part of the side-plates. Subsequent stages are the same, i.e. the drum is extended similarly on either side of the rows of vanes 2' and 2" by the side-plates 7', 8', 7" and 8", respectively.

The outer surface of the drum between two adjacent side-plates 7 and 8, 7' and 8' or 7" and 8" is generally cylindrical. A series of openings is made in this surface, each of which receives the platform 5 of a vane 2. Said openings have a constant parallelogram shape with rounded corners. The platforms 5, 5', 5" of the vanes have a shape corresponding to that of the openings. Each platform is inserted in a corresponding opening and is then fixed thereto by welding around the entire periphery of the platform. Although generally flat, the platforms can be slightly curved in one direction so as better to follow the cylindrical shape of the outer surface of the drum between two ribs. Each platform is inserted in its respective opening so that its outer surface is flush with the outer surface of the opening directly at its edge.

Figure 3:
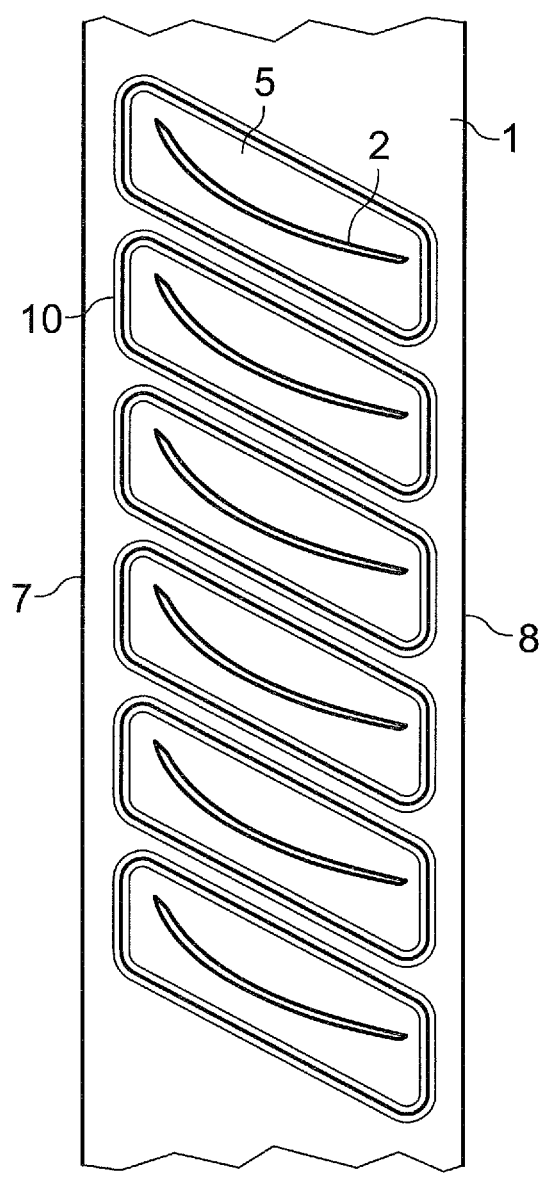
FIG. 3 is an elevation view of a row of vanes of the drum, this view being represented in a plane.

FIG. 3 is a view in elevation of a row of vanes of the drum, this view being represented in a plane corresponding to the plane of the page. This figure clearly shows the parallelogram shape of the openings 10 and platforms 5. The profile 2 of the vanes at the platform is clearly represented. The parallelogram shape of the openings and platforms is chosen in such a way that the profile of the vane is more or less centered on the surface defined by the platform. The four edges of the platform are thus separated from the root of the vane. This arrangement has the advantage that the thermal stresses caused by the operation of welding the platform to the drum are not transmitted directly to the root of the vane. Moreover, the presence of material between the openings guarantees that the shape and dimensions of the drum will remain within rather strict tolerances before and after the installation of the vanes, in spite of the welding operation. The openings 10 are typically made by machining. Other methods known to a person skilled in the art can also be considered.

The rotor vanes are obtained by forging, casting or other method and then machined to form their head and platform in the final shape and size. An assembly clearance typically on the order of a few tenths of a millimeter or on the order of a millimeter is provided between the outer edges of the platform 5 and the inner edges of the opening 10.

The side-plates 7 and 8 on either side of the row of openings are in proximity to the upstream and downstream edges of the openings. This proximity is best illustrated in FIG. 2, which shows that these side-plates form an annular outward extension having approximately the width of the side-plates in a direction parallel to the axis of the drum. Said proximity makes it possible to absorb the centrifugal forces to which the vanes are subjected. The distance between the inner faces of two side-plates on either side of a row of vanes is equal to or slightly greater than the width of the vanes measured at the platform in a direction parallel to the axis of the drum, typically up to 110% of said width.

As can be seen in FIG. 1, the side-plates 7 and 8 also form an annular extension toward the interior of the shell of the database having approximately the width of the platforms in a direction parallel to the axis of the drum. These ribs make it possible to reinforce the stiffening of the drum and to reduce the ovalization thereof in the event of imbalance of the mass in rotation, for example when there is a loss of a fan blade.

The concept of attaching vanes and stiffening the drum by the ribs as described allows a saving of material at the shell and thus allows the shell to be closer beneath the ferrules of the stator vanes with the resulting shortening of the wipers.

FIG. 3 shows that the platforms and openings have a constant shape. However, platforms of different dimensions and/or shapes along one row could be considered. For example, a platform could include two, three or more vanes and have the resulting dimensions. FIG. 2 illustrates a constant spacing between the vanes of a row. However, the spacing could be varied while still preserving the principle of the invention.

The drum as illustrated in FIGS. 1 and 2 is of a single piece, i.e. it is machined from a forging for example. However, a hybrid drum could be considered, only one part of which would be made of a single piece, specifically the part comprising one or more rows of vanes positioned with their platforms in corresponding openings and welded at the platform/opening junction. Such a drum part could then be attached to another part, such as a monoblock bladed disk for example.

Figure 5:
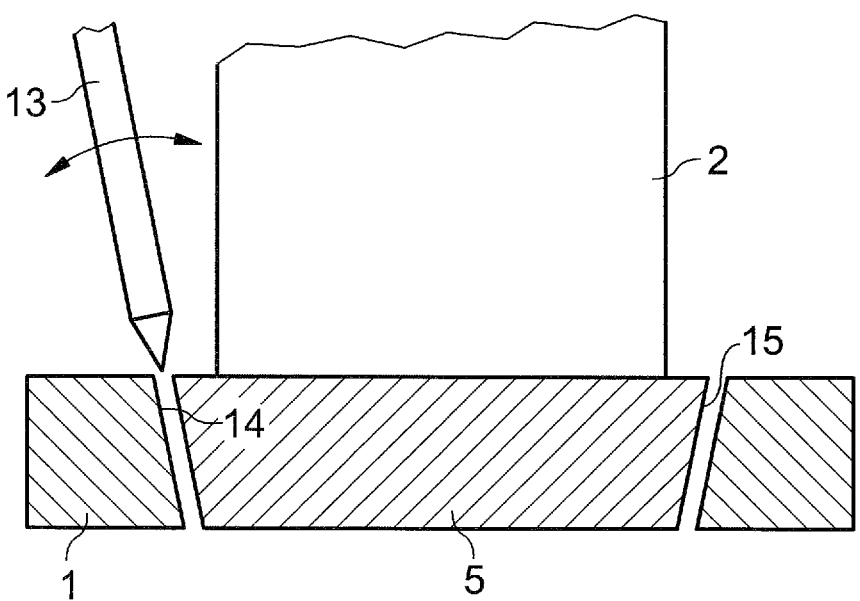
FIG. 5 is a cross section of the platform of a vane housed in the corresponding opening made in the shell of the drum and illustrating the method of welding the platform and the drum.

The method of welding platforms to the drum is illustrated in FIG. 5, which is a cross section of the platform of a vane positioned in an opening of the drum ready to be welded. The edges of the platform as well as the corresponding edges of the opening are beveled. The bevel is such that the platform is installed in the opening from the exterior of the drum and the platform is prevented from passing through beyond the opening. The bevel is formed by a flat surface of each edge 14 of the opening and each edge 15 of the platform inclined at an angle of several degrees, typically between 5 and 20°. It should be noted that it is enough that the faces of the two opposite edges be beveled in order to achieve the positioning advantages indicated above. The weld applied by the electrode 13 is done from the exterior of the drum and joins the edges of the platform and the opening around the entire periphery. Different welding methods, such as electron beam welding, laser welding, TIG (tungsten inert gas) and brazing, are applicable depending on different parameters such as, for example, the materials to be welded, the geometry and direction of the weld beads. A conical weld is described here, but a cylindrical weld can also be considered, with no beveling of the openings of the drum and platforms of the vanes.

Figure 4:
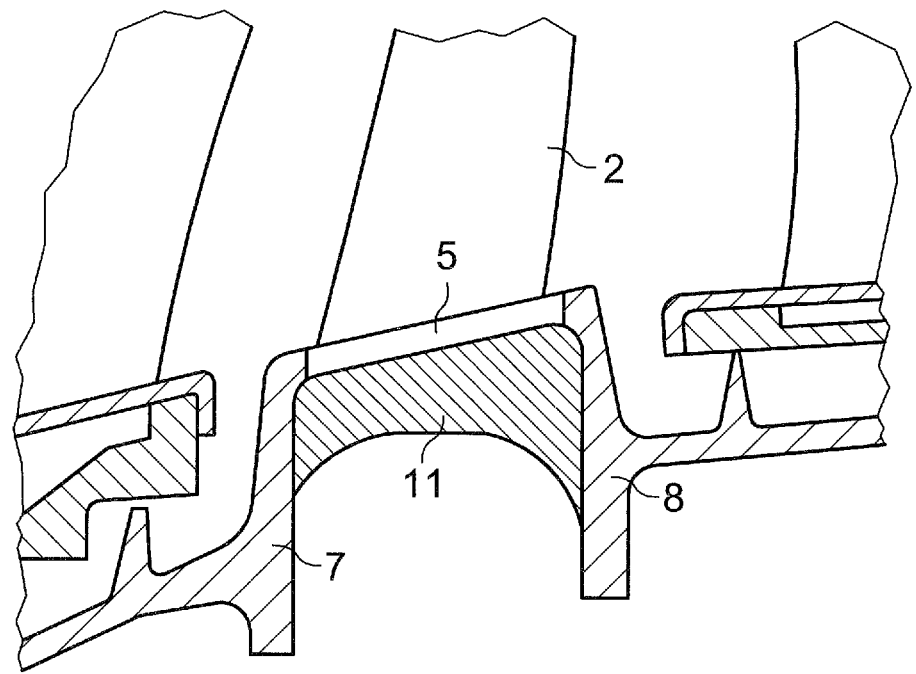
FIG. 4 is a cross sectional view of part of the drum according to the present application, wherein the elastomer is applied beneath the vanes and against the side-plates of the drum.

FIG. 4 is an enlarged view in cross section of a vane and of part of the drum on either side of the vane. An elastomer 11 is applied under the platform 5 of the vane 3 and on the adjacent inner faces of the side-plates 7 and 8. Said elastomer absorbs vibrations from the vanes and drum. The presence of a cavity formed by the side-plates and the platform of the vanes is particularly advantageous for the application of such an elastomer.

We claim:

1. A compressor drum rotor stage for an axial turbo-machine, comprising:
    a hollow body in the form of a shell, generally symmetrical in revolution about an axis of revolution corresponding to the axis of the turbo-machine; and
    a plurality of vanes arranged at the periphery of the body;
    wherein each vane of the plurality of vanes at its root comprises:
    an attachment platform housed in a corresponding opening made in the shell, each platform being housed in a corresponding opening in such a way that the outer surface of each platform is essentially flush with the outer surface of the hollow body at the edge of the corresponding opening; and
    each platform is attached to the hollow body by welding between the outer edge of the platform and the inner edge of the corresponding opening;

wherein the shell comprises two outer side-plates, each generally in a plane perpendicular to the axis, one being upstream and the other downstream from the row of openings, and a generally cylindrical part formed as an integral part of the downstream side-plate and having at least one circular rib around the circumference of the shell intended to engage by friction with a ferrule of a guide vane, forming with the row of rotor stage vanes a compressor stage.

2. The compressor drum rotor stage according to claim 1, wherein the openings are made in the hollow body in such a way as to form at least one row around the circumference of the hollow body.

3. The compressor drum rotor stage according to claim 1, wherein the hollow body is of a single piece of the same material.

4. The compressor drum rotor stage according to claim 1, wherein the openings are made in the hollow body by machining.

5. The compressor drum rotor stage according to claim 1, wherein the openings and the corresponding platforms have the general shape of a parallelogram with rounded corners.

6. The compressor drum rotor stage according to claim 1, wherein the outer edges of the side-plates are in proximity to the openings of the row.

7. The compressor drum rotor stage according to claim 1, wherein the hollow body comprises:
two interior annular ribs each forming one of the upstream and downstream side-plates of the row of openings.

8. The compressor drum rotor stage according to claim 1, wherein an elastomer is applied to the inner face of the platforms and the inner faces of the upstream and downstream side-plates in order to provide absorption of vibrations from the vanes and the hollow body.

9. The compressor drum rotor stage according to claim 1, wherein at least two opposite edges of the openings and the corresponding edges of the platforms are beveled so as to reduce the passage cross section of the openings to the interior of the hollow body, thus allowing the installation of the vanes in the openings from the outside of the hollow body.

10. The compressor drum rotor stage according to claim 1, wherein the connection by welding between the platforms and the openings is made around the entire periphery of the platforms.

11. The compressor drum rotor stage according to claim 1, wherein the connection by welding between the platforms and the openings is made starting from the outer surface of the hollow body.

12. The compressor drum rotor stage according to claim 1, wherein each vane of the plurality of vanes is of a piece with its platform formed as an integral part of the platform.

13. A compressor drum for an axial turbo-machine, comprising:
at least one rotary stage comprising:
a hollow body in the form of a shell, generally symmetrical in revolution about an axis of revolution corresponding to the axis of the turbo-machine; and
a plurality of vanes arranged at the periphery of the body;
wherein each vane of the plurality of vanes at its root comprises:
an attachment platform housed in a corresponding opening made in the shell, each platform being housed in a corresponding opening in such a way that the outer surface of each platform is essentially flush with the outer surface of the hollow body at the edge of the corresponding opening; and
each platform is attached to the hollow body by welding between the outer edge of the platform and the inner edge of the corresponding opening;
wherein the shell comprises two outer side-plates, each generally in a plane perpendicular to the axis, one being upstream and the other downstream from the row of openings, and a generally cylindrical part formed as an integral part of the downstream side-plate and having at least one circular rib around the circumference of the shell intended to engage by friction with a ferrule of a guide vane, forming with the row of rotor stage vanes a compressor stage.

14. A method of obtaining a compressor drum stage for an axial turbo-machine, comprising:
providing a hollow body in the form of a shell generally symmetrical in revolution with respect to an axis of rotation corresponding to the axis of the turbo-machine;
providing a plurality of vanes with an attachment platform at the root of each vane; and
attaching the vanes to the hollow body by their attachment platforms;
wherein openings corresponding to the platforms of the vanes are made in the shell; the shell comprising two outer side-plates, each generally in a plane perpendicular to the axis, one being upstream and the other downstream from the row of openings and a generally cylindrical part formed as an integral part of the downstream side-plate and having at least one circular rib around the circumference of the shell intended to engage by friction with a ferrule of a guide vane, forming with the row of rotor stage vanes a compressor stage, and the step of attaching the vanes consists of inserting the platform of each vane in a corresponding opening of the hollow body in such a way that the outer surface of each platform is essentially flush with the outer surface of the hollow body at the edge of the corresponding opening; and in attaching each platform to the hollow body by welding between the outer edge of the platform and the inner edge of the corresponding opening.

15. The method according to claim 14, further comprising:
inserting a cylinder into the hollow body during the welding operation in order to protect the other parts of the drum.

* * * * *